Patented May 26, 1942

2,284,479

UNITED STATES PATENT OFFICE 2,284,479

CATALYTIC HALOGENATION OF UNSATURATED ORGANIC COMPOUNDS

Frederick F. Rust and William E. Vaughan, Berkeley, Calif., assignors to Shell Development Company, San Francisco, Calif., a corporation of Delaware No Drawing. Application September 30, 1939, Serial No. 297,365

16 Claims. (Cl. 260—654)

The present invention relates to the halogenation of unsaturated organic compounds, and more particularly covers the process in which unsaturated compounds of the hereinbelow described type are subjected to a halogenation reaction in the presence of a catalyst, and preferably at temperatures below those necessary for effecting a substantial halogenation under ordinary, thermal, non-catalytic operation conditions. In one of its specific embodiments, the present process is essentially one of halogenation in the vapor phase and at elevated temperatures which, however, are below those necessary for effecting vapor phase halogenation when no catalyst is employed. The process is also applicable to the catalytic halogenation of certain unsaturated compounds at ordinary temperatures and in the liquid phase.

It was previously found that unsaturated organic compounds of primary and/or secondary character may be subjected to halogenation when the reaction is effected in a liquid phase or in the presence of a liquid film in the reaction vessel, such reaction being one of halogen addition in which the halogen adds to the olefinic linkage to saturate the same and yield a saturated polyhalide. It is also known that halogenation of unsaturated organic compounds of primary or secondary character in a truly vapor phase requires relatively high temperatures and/or halogenation promoting agents, such as light or a catalyst. In the case of non-catalytic thermal vapor phase halogenation of the above group of compounds, it is necessary to employ relatively high temperatures before any substantial halogenation per unit time may be attained. The lower limits at which such vapor phase non-catalytic halogenation may be effected will vary with the specific unsaturated compound subjected to the reaction conditions, as well as with other operating conditions, such as the ratio of the unsaturate to the halogen, residence time, etc. Thus, in the case of ethylene, the non-catalytic halogenation of this unsaturated organic compound is substantially ineffective until a temperature of about 225° C. is attained. In the particular case, the molal ratio of ethylene to chlorine was 2:1 and the residence time was about ⅕ second. As stated, the lower limit for such halo-substitution will vary somewhat with changes in the operating conditions. On the other hand, when a mixture of propylene and chlorine in a mol ratio of 2:1 was conveyed at the same rate through a reaction zone maintained at 210° C. about 5% of the chlorine was found to have reacted, thus clearly indicating that the halogenation of propylene under the above conditions, in the vapor phase begins somewhat below 200° C.

It was also previously discovered that unsaturated organic compounds of primary and secondary character, when subjected to vapor phase high temperature halogenation, react with the halogen both by way of addition and substitution. Above the afore-mentioned lower temperature limit at which truly vapor phase halogenation may be effected, the halogenation at first is predominantly one of halogen addition. However, as the reaction temperature is elevated, a point is reached at which the rate of halo-substitution becomes so much greater than that of halogen addition that the resulting product of reaction predominates in products of halo-substitution. A further increase in the reaction temperature produces products of halo-substitution to the substantial exclusion of products of halogen addition. Accordingly, when it is desired to obtain predominantly products of halo-substitution of unsaturated organic compounds of primary and secondary character by the thermal non-catalytic halogenation, it is necessary to employ relatively high temperatures. Thus, a preferred temperature range for the production of vinyl chloride by the thermal chlorination via substitution of ethylene is above 300° C., the conversion being substantially quantitative at about 400° C. On the other hand, in order to chlorinate propylene to allyl chloride, the preferred temperature range is from 350° C. to about 675° C., while a preferred temperature range for the allylic halo-substitution of normal butylenes is from about 200° C. to about 400° C. As stated, in order to obtain substantially complete conversion to products of halo-substitution, it is necessary to operate at the higher limits of the specified preferred ranges, since at the lower limits of such ranges, although some halo-substitution occurs, the products of the addition reaction nevertheless predominate, or, at least, the product contains appreciable percentages of compounds formed via halogen addition.

It has now been discovered that effective halogenation may be realized at temperatures below those at which vapor phase halogenation is attainable by the thermal non-catalytic halogenation, although the reaction is effected with a true vapor phase and without the presence of a liquid in the reaction zone. It has been further discovered that such halogenation of unsaturated organic compounds of the mentioned class may be realized at temperatures below those heretofore necessary for vapor phase thermal non-catalytic halogenation by effecting the reaction in the presence of certain catalysts having definite and specific characteristics. Generally speaking, these catalysts comprise compounds which are in the form of free radicals or which may yield free radicals under the halogenating conditions.

The term "free radical" as employed herein refers to an organic compound in which all of the valences are not satisfied (see Hackh's Chemical Dictionary, 2nd edition, page 397). These free radicals are electrically neutral molecules possessing at least one unpaired electron, and exhibiting an unsaturated behavior. These properties distinguish them from ions (such as those obtained by ionization of certain solids or by electric discharges in gases).

It has also been discovered that the free radicals catalyze the reaction by the halogens and unsaturated organic compounds of the above defined and hereinafter described class so that the halogenation reaction may be effectively and efficiently realized in the vapor phase and at relatively low temperatures which are below those heretofore essential for effecting a truly vapor phase thermal non-catalytic halogenation. Thus, as will be brought out more fully hereinbelow, by using a free radical (or organic compounds which yield free radicals under operating conditions, or which exist in the form of free radicals under the operating conditions) as the catalyst, it is now possible to effect the reaction between a halogen and an unsaturated organic compound of primary or secondary character to produce high yields of products of halogenation, even at temperatures at which no or substantially no halogenation could be realized in the vapor phase, if the reaction were to be attempted at such temperatures without the use of the catalyst. It was further discovered that the presence of the free radicals permits the effecting of the vapor phase halogenation reactions at temperatures below 175° C. to 200° C., which is usually the minimum temperature range for the non-catalytic thermal halogenation of the hereinafter described class of unsaturated organic compounds of primary and secondary character.

Furthermore, it has been discovered that the presence of the catalysts described herein, not only allows vapor phase halo-substitution and halogen addition at temperatures below those necessary for efficient and substantial halogenation under thermal, non-catalytic operating conditions, but also increases the rate of halogenation, so that, under identical operating conditions, the halogenation in the presence of the organic free radicals of the present invention requires a relatively shorter period of residence time in the reaction zone as compared to that necessary for a similar halogenation conversion when the unsaturated compound of the described class is subjected to a thermal, non-catalytic treatment. Therefore, other conditions being equal, the present process permits the utilization of greater space velocities to effect the same degree of conversion of the unsaturated organic compounds of primary and/or secondary character into their substitutively halogenated derivatives, thus increasing the effective capacity of any given reaction chamber or unit.

The halogenation of unsaturated organic compounds of tertiary character such as tertiary olefins is not strictly within the scope of the present invention. However, under certain conditions the principles of the invention may be applied to the halogenation of such tertiary olefins. This is due to the fact that the normal tendency of tertiary olefins is to undergo halo-substitution to the exclusion of the halogen addition reaction at ordinary and even reduced temperatures. On the other hand, the presence of free radicals of the present invention during the halogenation of such unsaturated organic compounds of tertiary character, and particularly when the reaction is effected at low temperatures, induces the production of halogen addition products. Therefore, when it is desired to effect a halo-addition to tertiary olefins, it is possible to operate according to the present invention by employing the herein described catalysts.

Representative unsaturated compounds of the class which may be halogenated according to the present invention primarily comprise ethylene and products of its partial halo-substitution such as vinyl chloride, vinyl bromide, acetylene dichloride, brom-substituted vinyl chloride and the like; secondary olefins such as propylene, normal butylenes, normal amylenes, secondary iso-amylene, normal hexenes, iso-hexenes of secondary character, normal heptenes, iso-heptenes of secondary character and the straight and branched chain secondary octylenes, nonylenes and the like; the halo-substituted normal and branched chain secondary olefins such as 1-chloro-propene-1, 1-bromopropene-1, 2-chloropropene-1, 2-bromopropene-1, 1-chlorobutene-1, 2-bromo-butene-1, 2-chlorobutene-1, 2,2-dibromobutene-1, 1-chlorobutene-2, 2-chlorobutene-2, 1,1-dichlorobutene-2, 1,2-dichlorobutene-2, 4-bromobutene-1, 1,4-dichlorobutene-1, 2-chloropentene-1, 1-chloropentene-2, 1-chloro 3 methyl butene-1, 2-chlor-3-brom-propene-1, 3-chlor-2-brom-propene-1, and the like, their homologues and analogues; and cyclic olefinic compounds of secondary character and halo-substitution products thereof, such as cyclobutene, cyclopentene, cyclohexene, cycloheptenes, cyclooctenes, and the like, as well as the halo-substituted cyclic olefins of secondary character. The primary and secondary olefins, the cyclic olefins of seondary character, and the halo-substitution products of such compounds of aliphatic character, may be linked to one or more cycloalkyl and/or aromantic radicals. For example, compounds such as 1-phenyl propene-2, 1-phenyl chloro-propene-2, 1-phenyl butene-2, and the like, may be halogenated in accordance with the process of the invention. Also, unsaturated organic acids, ketones, alcohols, esters, etc., of primary and secondary character also fall within the class of compounds which may be halogenated according to the present invention.

As stated, all compounds which exist in the form of free radicals or which yield free radicals under the halogenating conditions, are suitable as halogenation promoting catalysts, these compounds having the characteristics of favoring or catalyzing the halogenation reaction, and thus allowing the effective realization of the halogenation reaction at temperatures substantially lower than those heretofore necessary and/or desirable for the thermal non-catalytic halogenation of the described class of unsaturated organic compounds. Also, these catalysts increase the rate of reaction, thus increasing the effective capacity of a reaction unit. In this connection it must be noted that the catalytic effect of the free radicals on the vapor phase halogenation of unsaturated organic compounds differs depending on whether the primary material employed is an unsaturated organic compound of primary or of secondary character. Thus, as will be shown more fully in the examples presented hereinbelow, the presence of the organic free radical catalyst, although favoring or catalyzing the halogenation of both types of compounds, has apparently different effects on the resulting products of reaction. For example, in the case of unsaturated organic compounds of primary character, such as ethylene or its products of partial halogenation, the free radicals promote halogen addition at temperatures at which no halogenation may be realized in a vapor phase by a thermal non-catalytic treatment. The free radicals, however, when applied to the halogenation of ethylene and/or its products of halo-substitution, apparently do not promote halo-substitution at least at temperatures of below about 140° C. On the other hand, when the halogenation reaction in the presence of the free radicals is applied to the treatment of unsaturated organic compounds of secondary character, the presence of such organic free radicals promotes both substitution and addition reactions. However, at the higher temperatures, which nevertheless are below the temperatures at which non-catalytic halogenation may be effected, the catalyst apparently promotes halo-substitution in preference to halogen addition.

Broadly stated, the substances which are suitable as the catalysts for the halogenation reaction according to the process of the present invention comprise the organo-metallic compounds, azo compounds, organic peroxides and the organic free radical compounds. The first three groups of these compounds comprise substances which yield free radicals under the operating conditions existing during the halo-substitution reaction, while the fourth group comprises compounds which exist as, or readily dissociate reversibly into free radicals.

Representative compounds which exist in the form of free radicals are the substances containing trivalent carbon, as triarylmethyls of the type of triphenyl methyl, and trialkylmethyls of the type of triethyl methyl, compounds which contain bivalent and quadrivalent nitrogen, compounds containing univalent oxygen or sulfur, and the like. A more complete list of such organic free radical compounds is to be found in the 1938 edition of "Organic Chemistry—An Advanced Treatise," by H. Gilman and others, vol. I, pages 489–541.

As to the azo-compounds, reference is made to azo-methane which decomposes thermally, photo-chemically or catalytically to yield free radicals. Other compounds of this group include azo-benzene, diazomethane, azo-diisopropane, azo-isopropane, etc. Representative organic peroxides suitable as catalysts for promoting the halo-substitution reaction, according to the present invention include benzoyl peroxide, lauroyl peroxide, and the like.

It was stated above that organo-metallic compounds are highly suitable for promoting the halogenation reaction in accordance with the process of the present invention. Without any intention of being limited by the compounds enumerated herein, it may be stated that representative compounds of this class or group include substances of the type of tetraethyl lead, tetramethyl lead, tetraphenyl lead, tetraethyl tin, dimethyl-diethyl tin, tetramethyl tin, trimethyl-ethyl tin, tetraethyl germanium, diphenyl germanium, di- and trivalent organo-tin compounds of both the aliphatic and aromatic series, as triphenyl tin and diethyl tin, organo-lead compounds containing di- and trivalent lead, and the like, their homologues and analogues. Although the above-mentioned organo-metallic compounds cover substances in which a carbon atom of the organic radical is united directly to a metal atom of the fourth group of the Periodic Table, it is to be understood that organo-metallic compounds containing metals of other groups are also suitable catalysts. Thus, dimethyl cadmium, dipropyl cadmium, trimethyl lanthanum, trimethyl bismuth, triphenyl bismuth, tetraphenyl chromium, hexaphenyl diisilane, and similar compounds may be employed as the catalysts for the halogenation of the unsaturated organic compounds of the outlined class according to the process of the present invention. In fact, a description and discussion of organo-metallic compounds (suitable as such halogenation promoting agents) may be found at pages 406–498 of the above-mentioned Gilman's "Organic Chemistry—An Advanced Treatise."

As mentioned, the optimum temperatures to be employed for the halogenation according to the present invention will depend on a number of variables, such as the specific unsaturated organic compound to be halogenated, the halogen employed therefor, the residence time, the ratio of organic compound to halogen, as well as on the specific organo-metallic compound, azo-compound, organic peroxide or organic free radical employed as the catalyst. Thus, the temperature must be such that the organic peroxide, organo-metallic compound, or azo-compound is decomposed or cleaved to liberate the organic free radicals which catalyze the desired halogenation reaction. Since such temperatures will be different for the various catalysts falling within the class of compounds comprising the halogenation promoting agents of the present invention, it is impossible to specify definite optimum temperatures. However, it may be generally stated that, when an organo-metallic compound, an azo-compound or an organic peroxide is employed as the catalyst, it is possible to effect substantial vapor phase halogenation of the unsaturated organic compounds of primary and secondary character at temperatures substantially below those necessary for an equivalent degree of halogenation when the reaction is attempted in the vapor phase, but in the absence of such catalyst. Furthermore, when the reaction is effected at a temperature at which non-catalytic halogenation (whether via halogen addition or halo-substitution, or both) is obtainable by non-catalytic thermal treatment with a halogen, the presence of the above-identified catalyst greatly increases the rate of reaction, thereby permitting greater space velocities through a given reaction unit. It must be noted that some of the free radical yielding compounds of the groups described herein do not liberate such organic free radicals unless subjected to excessively high temperatures. Such compounds may, therefore, not be useful as halogenation promoting catalysts, since the high temperatures necessary for their decomposition or cleavage will also initiate the halogenation reaction by activating the halogen and thus initiate the reaction chain mechanism. It is possible, however, that the halogen will react with such organo-metallic compounds, azo-compounds or organic peroxides to effect the cleavage thereof, thereby liberating free radicals and further promoting or increasing the rate of halogenation under the operating conditions.

The invention is illustrated by the following examples which are presented for the purpose of showing the advantages derived from operating according to the process of the present invention, and the results obtained thereby. It is understood, however, that these examples are merely illustrative and are not to be considered as limiting the invention in any sense.

Example I

A gaseous mixture of ethylene, chlorine and a diluent, namely nitrogen, was reacted in the dark and without the addition of any free radical yielding catalyst of the type of tetraethyl lead. The diluted reactant mixture was conveyed through an all-glass reaction zone at a rate of 100 c.c./min. of ethylene, 50 c.c./min. of chlorine, and 150 c.c./min. of nitrogen. The reaction was attempted at temperatures of 110° C. and about 140° C. However, an analysis of the effluent gases indicated that no reaction occurred between the ethylene and the chlorine. In fact, no reaction could be detected until the mixture in the reaction zone was heated to a temperature of about 225° C.

Example II

Gaseous ethylene was first conveyed through a bath of tetraethyl lead maintained at 0° C. The ethylene thus saturated with tetraethyl lead was then conveyed at a rate of 100 c.c./min. together with 50 c.c./min. of chlorine and 150 c.c./min. of nitrogen through the same reaction vessel as that employed in Example I. The commingling of the above compounds was effected at the reaction temperature. The tetraethyl lead concentration was about 0.002 mol % based on the total gaseous mixture, the nitrogen being employed merely as a diluent to control and moderate the violence of the chlorination reaction.

Two experiments were conducted under the above conditions: in the first, the temperature in the reaction zone was maintained at 110° C., while in the second, the temperature was 132° C. An analysis of the effluent gases indicated that in the first experiment, 16.4% of the chlorine was consumed, while 23.3% chlorine reacted at the higher temperature of 132° C. In both cases the halogen reacted only by addition, no products of halo-substitution being detectable in the reaction products.

A comparison of the results described in the above examples clearly shows the advantages obtained when an organic free radical is present to promote the halogenation of an unsaturated organic compound of a primary character, it being noted that very small percentages of such catalyst are sufficient to promote the reaction at temperatures at which no halogenation could be effected by a thermal, non-catalytic vapor phase treatment. Thus, whereas no reaction occurred when the reaction was attempted in the dark, in the vapor phase and without the use of a catalyst, until the temperature was raised to about 225° C., the presence of very small quantities of tetraethyl lead (about 0.002 mol %) which was picked up by the ethylene when the latter was passed through the catalyst bath maintained at 0° C., promoted at least partial halogen addition at temperatures as low as 110° C.

Example III

A mixture of chlorine, propylene and nitrogen, in a volumetric ratio of 1:2:3, was passed through a reaction chamber at a temperature of 210° C., and at a total rate of about 300 c.c./min. The reaction was attempted in the dark and without the use of any reaction promoting catalyst. An analysis of the effluent gases and of the reaction product showed that less than about 5% of the chlorine reacted with the propylene, about 3% by chlor-addition, and the rest by chlor-substitution.

Example IV

A mixture of propylene and chlorine was diluted with a mixture of carbon dioxide and nitrogen, and conveyed through a reaction zone at a rate of 100 c.c./min. of propylene, 50 c.c./min. of chlorine, 50 c.c./min. of nitrogen, and 100 c.c./min. of carbon dioxide. Prior to commingling, the carbon dioxide was first saturated with tetraethyl lead at 0° C. The catalyst concentration in the total mixture was about 0.002 mol %. The reaction vessel was the same as that employed for the chlorination of propylene in Example III, so that the residence time of the diluted chlorine-propylene mixture in the reaction vessel was the same for the runs in both examples.

Three runs were made, the first at a temperature of about 133° C., the second at about 158° C., and the third at about 196° C. The effluent gases and the reaction products obtained were analyzed, and the results are presented in the following table:

| Reaction temperature | Per cent chlorine reacting— | |
| --- | --- | --- |
| | By substitution | By addition |
| | Per cent | Per cent |
| 133° C | 25.3 | 51.0 |
| 158° C | 28.2 | 51.8 |
| 196° C | 36.1 | 47.9 |

A comparison of the results obtained in the runs presented in the preceding two examples clearly shows the advantages of employing organic free radicals to promote the halogenation of propylene. Thus, whereas only about 5% of the chlorine reacted with propylene when the reaction was effected non-catalytically at a temperature of 210° C., the presence of only 0.002 mol % of tetraethyl lead caused about 84% of the chlorine to react at 196° C. Even at the relatively very low temperature of about 133° C., the presence of the small quantity of the catalyst effected the reaction of more than 76% of the introduced chlorine.

Also, the presence of the organic free radicals greatly increased the percentage of chlorine which reacts by substitution. Thus, whereas only less than about 2% of the chlorine reacted via substitution when the reaction was effected without the use of a catalyst at a temperature of 210° C., the presence of the tetraethyl lead greatly promoted the chlor-substitution so that even at 133° C. about 25% of the chlorine reacted via substitution, this percentage increasing to about 36% when the catalyzed reaction temperature was elevated to 196° C. It is thus possible to chlorinate propylene and similar secondary olefins to produce allyl chloride and its corresponding homologues at temperatures which are considerably lower than those heretofore considered necessary, such chlorination via allylic substitution being promoted by the presence of even small quantities of the above-defined class of catalysts which exist as or form organic free radicals at the operating temperatures.

Since the quantity or percentage of the employed halogen which will react with the unsaturated organic compound, other conditions being equal, is a function of the residence time, i. e., the period of time during which the reacting substances are maintained in contact with each other at the given reaction temperature, the present process is not limited to the use of temperatures below those necessary for the halogenation by thermal, non-catalytic treatment. Thus, instead of employing such comparatively lower temperatures, it is possible to effect the catalyzed reaction according to the present process at substantially the same temperatures as those employed heretofore for the thermal, non-catalytic halogenation of the defined class of unsaturated organic compounds. In such a case, the presence of the described organic free radicals will increase materially the rate of reaction so that the residence time may be considerably shortened. This, in turn, will allow an increase of the throughput, thus greatly increasing the yields which may be obtained from a given reaction unit.

It is to be noted that the presence of the organic free radicals, such as the free radicals formed by the decomposition of the tetraethyl lead at the operating temperatures, although materially increasing the halo-substitution of propylene, also apparently promotes the halogen addition. Without any intention of being limited by any theories presented herein, it is believed, however, that the organic free radicals of the class described actually and preferentially promote the halo-substitution of unsaturated organic compounds of secondary character, and that the increase in the yield of products of halogen addition is due to reactions initiated on the surface of the reaction vessel, as distinguished from reactions initiated in the vapor phase by the free radicals. This conclusion is predicated on the following runs in which a propylene-chlorine mixture diluted with a nitrogen-carbon dioxide mixture in the same proportions as in Example IV was treated under the same conditions as those employed in said example. The mixtures, however, did not contain any tetraethyl lead, or any other organic free radical yielding catalyst. Three runs were made at temperatures of 133° C., 158° C., and 196° C., respectively. In other words, these runs were effected at the same temperatures as those employed in the above example in which tetraethyl lead was employed as the catalyst yielding organic free radicals. Each of these runs was preceded by a similar run in which tetraethyl lead was used, and it was noticed that a deposit (which is believed to be lead chloride) was found on the reaction walls after the halogenation with the tetraethyl lead. This deposit was allowed to remain on such walls for the present runs in which no organic free radical yielding compound was employed. The results of these runs in which no tetraethyl lead was used, but in which the deposit on the reaction walls was allowed to remain, were as follows:

| Reaction temperature | Percent chlorine reacting— | |
|---|---|---|
| | By substitution | By addition |
| | Percent | Percent |
| 133° C. | 2.7 | 34.0 |
| 158° C. | 3.2 | 34.8 |
| 196° C. | 6.0 | 37.8 |

It is thus seen that the presence of the lead chloride on the walls of the reaction vessel catalyzed the chlorination reaction, primarily via addition. A comparison of the data presented above with the results obtained during the chlorination under the same conditions, but in the presence of tetraethyl lead (Example IV), shows that the tetraethyl lead promotes the halo-substitution much more than it catalyzes the halogen addition reaction. In fact, it is possible that the differences in the percentages of chlorine reacting by addition in the two series of runs may be caused by the lead chloride formed during the reaction and maintained suspended as smoke in the reaction zone. In view of the above, it is believed that the ratio of the chlorine reacting via substitution to that reacting by addition may be greatly increased by effecting the halogenation reaction in the presence of the catalysts of the present invention in reaction vessels having a greater volume to wall-surface ratio.

As stated, very small quantities of catalysts are sufficient to effect substantial halogenation according to the present process. Thus, the examples show that excellent results were obtained when the catalyst concentration was as low as 0.002 mol % based on the total quantity of the diluted reactants employed. Generally, it is possible to effect the reaction with quantities of the above-defined catalyst ranging from very small percentages of the order of about 0.001 mol % or less to about 0.005 mol %, it being understood, however, that higher percentages may be found advantageous under certain conditions of operation.

The carbon dioxide and/or nitrogen were employed in the above examples for the purpose of diluting the hydrocarbon-chlorine mixture, such dilution facilitating the control of the reaction. Obviously, the use of such diluent may be dispensed with, or other inert diluents, such as helium, employed in connection with, or in lieu of the above diluents.

Although the invention has been described with particular reference to the chlorination of the identified class of unsaturated organic compounds, it is to be understood that the invention includes their bromination and/or iodination in accordance with the present process. Also, instead of employing a free halogen per se, any of the known free halogen yielding substances, such as sulfuryl chloride, nitrosyl chloride, etc., which are capable of liberating a free halogen under the conditions existing in the reaction system, may also be used.

The reaction may be effected at any suitable pressure. Generally, the halogenation reaction according to the present invention may be effected at atmospheric pressures, although higher or lower pressures are also permissible, and may even be somtimes advantageous.

We claim as our invention:

1. A process of halogenating propylene to obtain substantial quantities of allyl halide, which comprises reacting said propylene in the vapor phase with a halogen selected from the group consisting of chlorine, bromine and iodine, and affecting the reaction in the presence of small quantities of an added metallo-hydrocarbon compound which yields halogenation-promoting free radicals under the operating conditions.

2. The process according to claim 1 wherein tetraethyl lead is employed as the free radical yielding metallo-hydrocarbon compound.

3. The process according to claim 1, wherein the reaction is effected at an elevated temperature but below that at which substantial halogenation occurs during thermal non-catalytic halogenation.

4. A process of halogenating propylene to obtain substantial quantities of an allyl halide, which comprises reacting propylene in the vapor phase and at an elevated temperature below that at which substantial halogenation occurs during thermal, non-catalytic halogenation, with a halogen selected from the group consisting of chlorine, bromine and iodine, and effecting the reaction in the presence of a small amount of tetraethyl lead.

5. The process according to claim 4, wherein the reaction is effected in the presence of tetraethyl lead employed in a quantity of less than 0.005 mol percent.

6. The process of halogenating, via addition, an unsaturated organic compound of the class of ethylene and its products of partial halo-substitution, which comprises reacting said unsaturated organic compound in the vapor phase with a gaseous halogen selected from the group consisting of chlorine, bromine and iodine, and effecting the reaction in the presence of an added metallo-hydrocarbon compound which yields free radicals under the operating conditions.

7. The process according to claim 6, wherein the reaction is effected at an elevated temperature below that at which halogenation of the unsaturated compound occurs to any substantial extent during a vapor phase, thermal non-catalytic treatment with the halogen.

8. The process of halogenating ethylene, via addition, which comprises commingling ethylene and a halogen selected from the group consisting of chlorine, bromine and iodine, and reacting the mixture in the vapor phase, and at an elevated temperature below that at which halogenation of ethylene occurs to any substantial extent during a vapor phase, thermal, non-catalytic treatment with the halogen, in the presence of a small amount of tetraethyl lead.

9. A process of effecting substantial halogenation of an unsaturated organic compound of the class consisting of unsaturated hydrocarbons and halo-substituted unsaturated hydrocarbons containing an olefinic linkage between two non-tertiary carbon atoms, at least one of which is of secondary character, which comprises reacting said compound with a halogen selected from the group consisting of chlorine, bromine and iodine, and affecting the reaction in the vapor phase, in the absence of actinic radiation, at an elevated temperature, but below that at which substantial halogenation normally occurs during a thermal non-catalytic reaction, and in the presence of small quantities of a compound selected from the class consisting of organic free radicals and organic peroxides, azo-compounds and metallo-hydrocarbon compounds yielding free radicals under the operating conditions, thereby effecting a substantial halogenation of said unsaturated compound and producing a product predominating in products of halo-substitution of said compound subjected to halogenation.

10. The process according to claim 9, wherein the reaction is effected in the presence of quantities of a metallo-hydrocarbon compound which yields halogenation promoting free radicals under the operating conditions.

11. A process of halogenating an unsaturated organic compound of the class consisting of unsaturated hydrocarbons and halo-substituted unsaturated hydrocarbons containing an olefinic linkage between two non-tertiary carbon atoms, at least one of which is of secondary character, which comprises reacting said compound with a halogen selected from the group consisting of chlorine, bromine and iodine, and effecting the reaction in the vapor phase and in the presence of a small quantity of a halogenation-promoting catalyst selected from the class consisting of organic free radicals and organic peroxides, azo-compounds and metallo-hydrocarbon compounds capable of yielding free radicals under the operating conditions.

12. The process according to claim 11, wherein the halogenation reaction is realized in the absence of actinic radiation.

13. The process according to claim 11, wherein the reaction is effected at an elevated temperature which is below that at which thermal, non-catalytic vapor phase halogenation normally occurs to any appreciable extent.

14. A process of halogenating an unsaturated organic compound of the class consisting of unsaturated hydrocarbons and halo-substituted unsaturated hydrocarbons containing an olefinic linkage between two non-tertiary carbon atoms, at least one of which is of secondary character, which comprises reacting said compound with a halogen selected from the group consisting of chlorine, bromine and iodine, and effecting the reaction in the vapor phase, in the presence of a halogenation promoting catalyst selected from the class consisting of organic free radicals and organic peroxides, azo-compounds and metallo-hydrocarbon compounds capable of yielding free radicals under the operating conditions, and at a temperature below that at which non-catalytic vapor phase halogenation normally occurs to an appreciable extent.

15. In a process of halogenating an unsaturated organic compound containing an olefinic linkage between two non-tertiary carbon atoms, the step of effecting a reaction between said organic compound and a halogen selected from the group consisting of chlorine, bromine and iodine, in the vapor phase, in the presence of an added compound selected from the class consisting of organic free radicals and organic peroxides, azo-compounds and metallo-hydrocarbon compounds yielding free radicals under the operating conditions, and at an elevated temperature, but below that at which substantial halogenation normally occurs during a thermal, non-catalytic treatment of said organic compound with said halogen.

16. In a process of halogenating an unsaturated organic compound containing an olefinic linkage between two non-tertiary carbon atoms, the step of effecting a reaction between said organic compound and a halogen selected from the group consisting of chlorine, bromine and iodine, in the vapor phase and in the presence of an added compound selected from the class consisting of organic free radicals and organic peroxides, azo-compounds and metallo-hydrocarbon compounds yielding free radicals under the operating conditions.

FREDERICK F. RUST.
WILLIAM E. VAUGHAN.